Feb. 27, 1923.
J. W. WATERS
CAR BRAKE
Filed Aug. 4, 1921
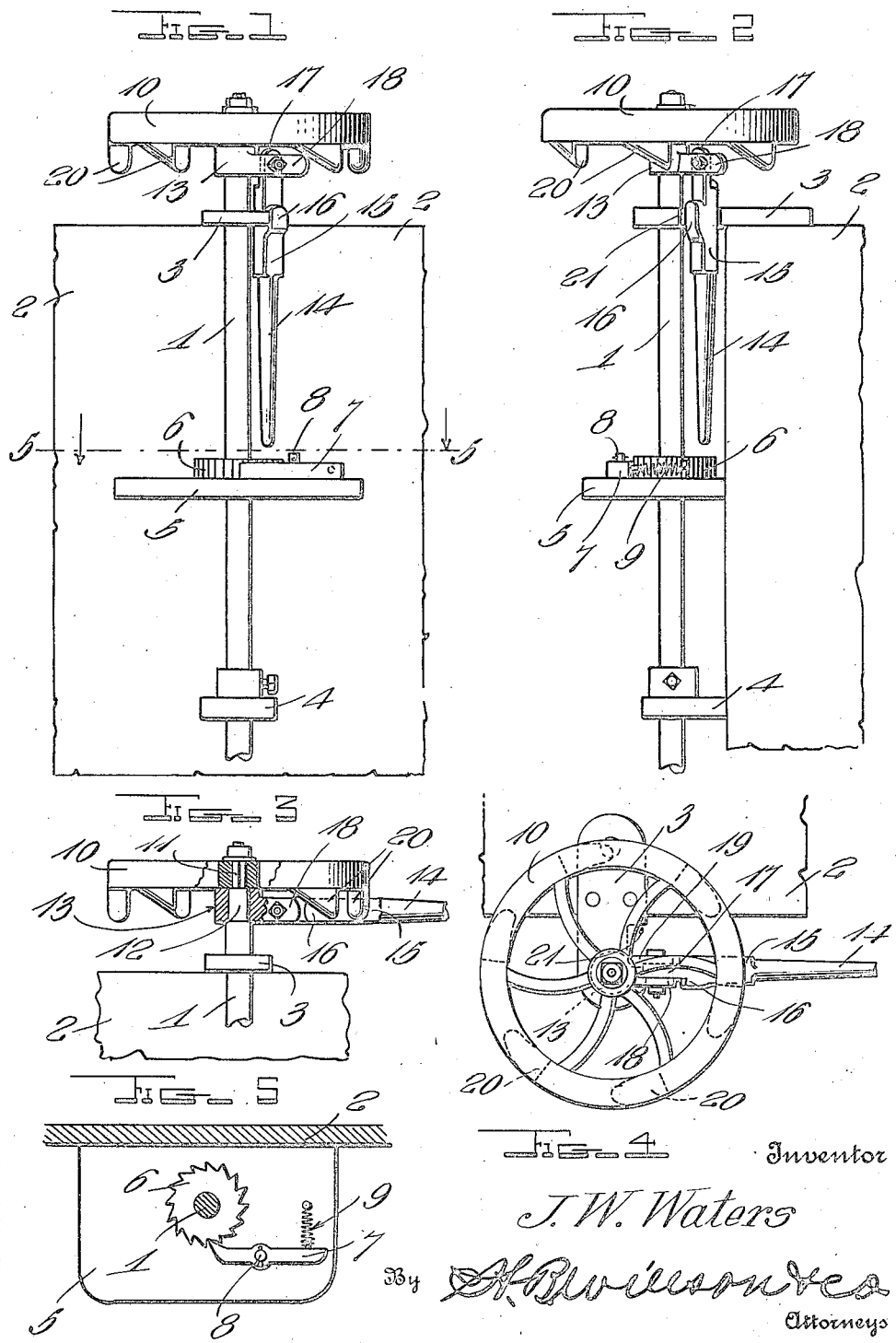
Inventor
J. W. Waters Patented Feb. 27, 1923.

1,446,676

UNITED STATES PATENT OFFICE.

JOHN W. WATERS, OF MONTGOMERY, WEST VIRGINIA.

CAR BRAKE.

Application filed August 4, 1921. Serial No. 489,843.

*To all whom it may concern:*

Be it known that I, JOHN W. WATERS, a citizen of the United States, residing at Montgomery, in the county of Fayette and State of West Virginia, have invented certain new and useful Improvements in Car Brakes; and I do declare the following to be be a full, clear, and exact description of the invention, such as will enable others skilled in the art to which it appertains to make and use the same.

This invention relates to an improved car brake of the type used upon freight cars and one object of the invention is to provide the brake setting shaft with an improved type of hand wheel and to also provide an improved type of lever handle for use in turning the hand wheel and thus permitting the brake to be very tightly applied.

Another object of the invention is to provide improved means for mounting the lever handle so that this handle may normally hang downwardly against the side of the car but may be swung upwardly and oscillated about the brake shaft and moved into and out of engagement with abutment blocks carried by the hand wheel.

Another object of the invention is to so construct these abutment blocks that they will be provided with cam faces which will serve to drive the handle over the abutment blocks when the handle is moved in one direction but permit the handle to have firm engagement with the abutment blocks when the handle is moved in an opposite direction.

Another object of the invention is to provide an improved type of pivotal connection between the handle and shaft-engaging collar, the pivotal connection being such that the handle will be braced at its pivoted end and the danger of the handle being broken or bent eliminated.

Another object of the invention is to so mount this handle that when swung downwardly to an inoperative position, it may be positioned in a recess formed in a bearing of the brake shaft and prevented from having a tendency to move about the brake shaft.

This invention is illustrated in the accompanying drawings, wherein:

Figure 1 is a view in elevation showing a brake shaft provided with the improved wheel and handle bar.

Figure 2 is a view in elevation showing the structure of Fig. 1 but looking from the side of a car instead of at the end of a car.

Figure 3 is a fragmentary view partially in elevation and partially in section and showing the handle bar swung upwardly to an operative position.

Figure 4 is a top plan view with the handle bar in the operative position.

Figure 5 is a transverse sectional view taken along the line 5—5 of Fig. 1.

The brake shaft 1 is of a conventional construction and is rotatably mounted at the rear of the freight car 2 and passes through bearings 3 and 4 and also passes through a platform 5 which extends from the end wall of the car. A ratchet wheel 6 is carried by the brake shaft 1 above the platform 5 and is engaged by a pawl 7 which is pivotally mounted by means of a pivot pin 8 and is yieldably held in engagement with the pawl by means of a spring 9. This pawl serves to normally permit rotation of the brake shaft in one direction but prevents rotation in a reverse direction and it will be readily seen that when the shaft is rotated to apply the brake, the pawl will prevent the shaft from turning in a reverse direction and releasing the brake. At the same time, the pawl can be easily moved to an inoperative position and thus permit the brake to be released.

A hand-wheel 10 is rotatably mounted upon the reduced and squared end portion 11 of the shaft 1 and is positioned above a reduced and rounded shaft section 12 upon which will be rotatably mounted a collar 13. By having the hand-wheel 10 mounted upon a flared shaft portion 11, the shaft may be rotated through the medium of the hand wheel and by having the collar rotatably mounted upon the reduced and rounded shaft section 12, a handle carried by this collar may be oscillated about the shaft and movement imparted to the shaft and wheel as will be hereinafter brought out. The lever or handle bar 14 is provided at its inner end with a thickened head 15 which is provided with a shoulder 16 at one side and is cut from opposite sides thus providing a tongue 17 which extends between the bearing arms 18 and 19 of the collar 13. From an inspection of Figure 4, it will be seeen that the bearing arm 18 is of greater length than the bearing arm 19 and extends along the side of the head 15 of the handle to a point adjacent the shoulder 16. Therefore, when the handle is swung to impart movement to the hand-wheel, the extended tongue or bearing arm 18 will serve to brace the handle and there will be less danger of the handle being bent or broken. The handwheel 10 has its rim provided with abutment blocks 20 which extend beneath the underface of this rim. Each of these abutment blocks is provided with a straight cut end and tapers from this straight cut end thus providing a cam face so that when the lever handle is swung clockwise in Fig. 4, the lever handle may easily ride over the abutment blocks and thus permit of the lever handle being swung into position for engaging one of the abutment blocks against the straight cut end thereof and impart rotary movement to the hand-wheel when the handle is swung counter-clockwise in Fig. 4.

When this brake is in place, the shaft extends through the bearings 3 and 4 and through the platform 5 and the pawl 7 engages the ratchet wheel 6, and prevents the shaft from having counter-clockwise movement. Under normal conditions, the handle will hang downwardly as shown in Figs. 1 and 2 and the head 15 will be positioned in a recess 21 formed in the bearing 3. By having the handle extending through this recess 21, it will be prevented from having movement about the shaft and it will be prevented from moving to a position in which it might swing away from the car and strike the brakeman who was about to apply the brakes. When the brake is to be applied, the handle is swung upwardly to the position shown in Figs. 3 and 4, and when in this position, the handle can be oscillated about the shaft. When the handle is moved about the shaft in a clockwise direction, the head 15 will engage against the straight cut face of one of the blocks 20 and rotary movement will be imparted to the wheel and to the shaft upon which the wheel is rigidly mounted. After the wheel and shaft have been rotated for a portion of a rotation, the handle will be swung back in a counter-clockwise direction and as it moves the head 15 will engage the cam faces of the blocks and will thus ride easily over the blocks until the handle is in position for engaging a desired block and permitting the wheel to be again rotated. During movement of the handle to a position for engaging a block, the shaft will be prevented from rotating in a counter-clockwise direction by the pawl 7. After the brake has been set, the handle will be again swung downwardly to the inoperative position and will hang as shown in Figs. 1 and 2. When it is desired to release the brake, it is simply necessary to move the pawl 7 out of engagement with the ratchet wheel and the shaft can then rotate in a counter-clockwise direction. When the brake is first applied, it is not necessary to make use of the handle as the shaft can be easily turned by means of the hand-wheel. Abutment blocks will however permit of a good grip being obtained upon the rim portion of the wheel and thus prevent danger of the hand slipping off of the wheel during cold weather when heavy gloves are worn by the brakeman. It will thus be seen that this brake structure is so constructed that with trouble, brakes already in use can be converted into brakes of the improved construction.

I claim:

1. The combination with a brake actuating shaft, of a hand wheel rigid upon said shaft, abutments carried by said wheel and having cam faces and straight cut faces, a collar loose upon said shaft beneath said wheel, a handle bar pivotally connected with said collar for vertical movement into and out of an operative position and when swung about the shaft in one direction moving over the cam faces of the blocks into position for engaging the blocks and rotating the wheel when swung in an opposite direction, and a bearing for the shaft provided with a recess to receive the handle when hanging in an inoperative position and hold the handle and collar against movement around the shaft.

2. The combination with a brake actuating shaft, of a hand wheel rigid upon the shaft, abutments carried by said wheel, a collar loose upon said shaft beneath said wheel, a handle bar pivotally connected with the collar for vertical movement into and out of an operative position with respect to the abutments carried by the wheel, and a bearing for said shaft provided with a recess to receive the handle when hanging in an inoperative position and hold the handle and collar against movement around the shaft.

3. The combination with a brake actuating shaft, of a bearing for said shaft, a hand wheel rigid upon the shaft, abutments carried by said hand-wheel, a collar loose upon said shaft, and a handle pivotally connected with the collar for vertical movement into and out of an operative position, the handle when swung upwardly to an operative position having engagement with said abutments for imparting rotary movement to the wheel and shaft when the handle is swung about said shaft, the handle when hanging in an inoperative position having engagement with said bearing to prevent the handle and collar from moving about the shaft.

In testimony whereof I have hereunto set my hand.

JOHN W. WATERS.